US012792929B2

(12) United States Patent
Atkinson, III et al.

(10) Patent No.: US 12,792,929 B2
(45) Date of Patent: Nov. 10, 2026

(54) SYSTEMS AND METHODS FOR CREATING, DISPLAYING AND USING VISUAL REPRESENTATIONS OF INFORMATION

(71) Applicant: Charles D. Atkinson, III, Cambridge, MA (US)

(72) Inventors: Charles D. Atkinson, III, Cambridge, MA (US); Hyo Luke Kahng, Fort Lee, NJ (US); Andrew Farrar, Cambridge, MA (US)

(73) Assignee: Charles D. Atkinson, III, Cambridge, MA (US)

( * ) Notice: Subject to any disclaimer, the term of this patent is extended or adjusted under 35 U.S.C. 154(b) by 1303 days.

(21) Appl. No.: 17/373,372

(22) Filed: Jul. 12, 2021

(65) Prior Publication Data

US 2022/0004889 A1 Jan. 6, 2022

Related U.S. Application Data

(63) Continuation of application No. PCT/US2020/013491, filed on Jan. 14, 2020.

(60) Provisional application No. 62/792,200, filed on Jan. 14, 2019.

(51) Int. Cl.

*G06N 5/022* (2023.01)
*G06T 15/06* (2011.01)
*G06T 15/08* (2011.01)
*G06T 17/00* (2006.01)

(52) U.S. Cl.

CPC ............ *G06N 5/022* (2013.01); *G06T 15/06* (2013.01); *G06T 15/08* (2013.01); *G06T 17/00* (2013.01)

(58) Field of Classification Search

None

See application file for complete search history.

(56) References Cited

PUBLICATIONS

Tiwana et al.; "Special Issue: Information Technology and Organizational Governance: The IT Governance Cube;" 2014; Journal of Management Information Systems/Winter 2013-2014 vol. 30, No. 3, pp. 7-12 (Year: 2014).*

ArcGIS; "How Create Space Time Cube By Aggregating Points work;" Oct. 22, 2018 capture with WaybackMachine; pp. 1-7; https://desktop.arcgis.com/en/arcmap/latest/tools/space-time-pattern-mining-toolbox/learnmorecreatecube.htm (Year: 2018).*

Quantin et al.; "Mass customization for cultural heritage 3D models;" Sep. 2015; Conference: 2015 Digital Heritage; pp. 1-5 (Year: 2015).*

* cited by examiner

*Primary Examiner* — Peter Hoang

(74) *Attorney, Agent, or Firm* — Brian M. Dingman; Prince Lobel Tye LLP

(57) ABSTRACT

A method for creating a visual representation of a conceptual framework for information, including placing visual representations of multiple separate steps in a plurality of separate volumes along an axis, wherein each step represents a temporal aspect and a spatial aspect, for each of the separate volumes, defining a plurality of separate sub-volumes organized along or parallel to x, y, and z mutually orthogonal axes of the volume, to create a conceptual framework, wherein each volume comprises the same quantity of separate sub-volumes, and displaying the conceptual framework.

12 Claims, 9 Drawing Sheets

30c

30b

SYSTEMS AND METHODS FOR CREATING, DISPLAYING AND USING VISUAL REPRESENTATIONS OF INFORMATION

CROSS-REFERENCE TO RELATED APPLICATIONS

This application claims priority of International Application PCT/US2020/013491 filed on Jan. 14, 2020, which itself claimed priority of Provisional Application 62/792,200 filed on Jan. 14, 2019.

BACKGROUND

This disclosure relates to creating, displaying, and using visual representations of information.

There is too much information available for organizations and people to effectively understand and synthesize for their particular needs. If volumes of information are not organized effectively their usefulness is greatly diminished.

With the advent and blossoming of the digital age, the types and quantity of information are increasing exponentially. Consider all of the information available on the World Wide Web. Given current manners of presenting, understanding, and utilizing information, humans are ill-equipped to effectively consider and use the overabundance of digital data.

SUMMARY

Existing conceptual frameworks, mapped to a geometry in one or two dimensions with arbitrary organizing principles, are not capable of dealing with the overload. Information is scattered, disorganized, and moving toward entropy. A nonintegrated and decentralized plethora of chaotic information lack an integrating user interface. This disclosure relates to a new framework that maps non-integrated to integrated, decentralized to centralized, and started to completed information. It must also map the mind to the geometry of the whole brain to provide an architecture for a visual representation of processes and information that will lead to better understanding, insights, and performance. The geometry of the subject three-dimensional architecture is based on left and right brain hemisphericity, limbic and cerebral hierarchy, and brainwave periodicity.

All features and steps described below can be combined in any technologically feasible manner.

Featured in this disclosure are methods for creating visual representations of a conceptual framework for knowledge. These visual representations are sometimes termed the "Frame" or the "Cube." Other terms used herein for the subject visual representations include The Framework—(which corresponds to the Internet), The Cube—(which corresponds to the Web), The DBLS—(which corresponds to a database and learning system), Charlie's Conceptual Cube (which corresponds to the World Wide Web), The Whole Brain 3D Conceptual Framework—(which corresponds to a psychological mind map and memory palace), The Atkinson Artificial Mind, The Mind Palace, The Whole System, and the Whole Connected Health System. These names reflect different perspectives such as Biological, Mental, Physical, Virtual, Philosophical, and Technological. The representations systematize ways to provide conceptual visual representations that can be used as thinking tools. The visual representations can be used, for example, to augment or assist human intelligence and thought. The visual representations can be used to accomplish one or more of the following: staging the time and space and prioritization of problem solving; organization of knowledge into more useful forms; division of subjects; systematization of perspectives on knowledge; and routinization and evaluation of performance.

In one aspect, a method for creating a visual representation of the structure, function, network and interconnections of a conceptual framework for knowledge, comprises developing visual representations segmented into sections of past, present and future time frames and placing the representations along a first (longitudinal) axis, developing visual representations of subconscious (memory), conscious awareness (consciousness) and imagination and placing the representations along a second (vertical) axis that is orthogonal to the first axis, developing visual representations into segmented sections of humanity, creativity and technology and placing the representations along a third (horizontal) axis that is orthogonal to the first and second axes, creating from these visual representations a representation of a conceptual cube with twenty seven separate volumes, one volume at each intersection of the three representations along each of the three axes. For each of the twenty seven volumes and in each of the three axes, five separate sub-volumes are defined, to create a framework. The framework is displayed, and can be filtered, interrogated and manipulated in iterative steps.

The method may further comprise tying first types of information to some or all of the volumes. The method may further comprise tying second types of information to some or all of the sub-volumes. The separate sub-volumes for each representation of the first axis may comprise interest, goals, strategy, structure, and execution, or their semantic equivalents. The separate sub-volumes for each representation of the second axis may comprise concepts, competencies, curricula, catalog, and collection, or their semantic equivalents. The separate sub-volumes for each representation of the third axis may comprise personal, social, organizational, political, and civilizational, or their semantic equivalents.

The representation is populated with data of the types described above. The data, or visual cues to data, is available to be visualized at the proper locations on the representation. In this manner the representation can act as a mind palace in which troves of useful information can be stored in context and accessed and used as desired, for example to assist in solving complex multi-variable and multi-factorial problems.

In an aspect, a method for creating a visual representation of a conceptual framework for information includes placing visual representations of multiple separate stages in a plurality of separate volumes along an axis, wherein each stage represents a temporal aspect and a spatial aspect. For each of the separate volumes a plurality of separate sub-volumes organized along or parallel to x, y, and z mutually orthogonal axes of the volume are defined, to create a conceptual framework. Each volume comprises the same quantity of separate sub-volumes. The conceptual framework is then displayed. The display can include real world metadata or visual cues to the information. Information that is associated with the volumes and sub-volumes can be stored in a database, retrieved via selection of the appropriate volume/sub-volume, manipulated, and re-stored in the database.

Some examples include one of the above and/or below features, or any combination thereof. In an example of an aspect a method for creating a visual representation of a conceptual framework for information includes placing visual representations of multiple separate volumes for the z axis for both the temporal aspects include past, present, and future, and the spatial aspects include back, present location, and forward. In an example each volume comprises five separate sub-volumes along or parallel to each of x, y, and z mutually orthogonal axes. In an example the separate sub-volumes for each representation of the z axis comprise these steps: interest, goals, strategy, tactics, and execution, the separate sub-volumes for each representation of the y axis comprise these layers: concept elements, lesson competencies, curricula, catalog content, and library collection, and the separate sub-volumes for each representation of the x axis comprise these categories: individual, social, organizational, political, and civilizational.

In another aspect a method for creating a visual representation of a conceptual framework for information includes placing visual representations of multiple separate divisions along an x axis, placing visual representations of multiple separate organizations along a y axis that is orthogonal to the x axis, creating, from these visual representations a representation of a two-dimensional x-y knowledge platform comprising a plurality of separate volumes, one volume at each intersection of the multiple representations along each of the two axes, and displaying the two-dimensional knowledge platform.

Some examples include one of the above and/or below features, or any combination thereof. In an example the multiple separate divisions along the x axis comprise humanity, creativity, and technology. In an example the multiple separate organizations along the y axis comprise memory, awareness, and imagination. In some examples the method further includes, for each of the separate volumes, defining a plurality of separate sub-volumes organized along or parallel to x, y, and z axes of the volume, wherein each volume comprises the same quantity of separate sub-volumes. In an example each volume comprises five separate sub-volumes along or parallel to each of x, y, and z mutually orthogonal axes. In an example the separate sub-volumes for each representation of the z axis comprise these five steps: interest, goals, strategy, tactics, and execution, the separate sub-volumes for each representation of the y axis comprise these five layers: concept elements, lesson competencies, curricula, catalog content, and library collection, and the separate sub-volumes for each representation of the x axis comprise these five categories: individual, social, organizational, political, and civilizational.

In another aspect a method for creating a visual representation of a conceptual framework for information includes placing visual representations of multiple separate stages along a z axis, wherein each stage represents a temporal aspect and a spatial aspect, placing visual representations of multiple separate divisions along an x axis that is orthogonal to the z axis, placing visual representations of multiple separate organizations along a y axis that is orthogonal to the x and z axes, creating, from these visual representations a representation of a three-dimensional mind palace structure comprising a plurality of separate volumes, one volume at each intersection of the multiple representations along each of the three axes, and displaying the three-dimensional mind palace.

Some examples include one of the above and/or below features, or any combination thereof. In an example the temporal aspects comprise past, present, and future, and the spatial aspects comprise back, present location, and forward. In an example the method further includes, for each of the separate volumes, defining a plurality of separate sub-volumes organized along or parallel to x, y, and z axes of the volume, wherein each volume comprises the same quantity of separate sub-volumes. In an example each volume comprises five separate sub-volumes along or parallel to each of x, y, and z mutually orthogonal axes. In an example the separate sub-volumes for each representation of the z axis comprise these steps: interest, goals, strategy, tactics, and execution, the separate sub-volumes for each representation of the y axis comprise these layers: concept elements, lesson competencies, curricula, catalog content, and library collection, and the separate sub-volumes for each representation of the x axis comprise these categories: individual, social, organizational, political, and civilizational.

DETAILED DESCRIPTION

Figure 1:
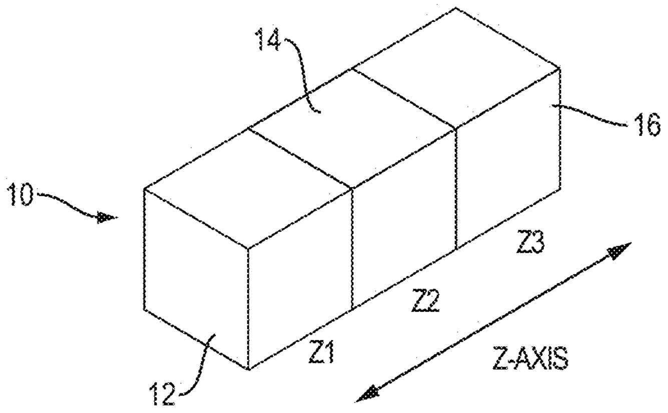
FIG. 1 illustrates a one-dimensional visual representation of a conceptual framework for information along the z axis.

A mind palace is a visual representation of a conceptual three-dimensional framework for information. A mind palace can consist of visual representations of multiple macro volumes as divisions, organizations, and stages. In one aspect of a part of a mind palace the stages or volumes are located along a first axis, which may be the z axis. Each stage or volume can represent both a temporal aspect and a spatial aspect. Each stage or volume can be subdivided into a number of separate micro-level subdivisions or sub-volumes organized along or parallel to x, y, and z mutually orthogonal axes of the divisions, organizations, and stages in a 3D framework, where there are the same quantity of separate subdivisions or sub-volumes in each stage or volume. This results in a conceptual framework. Each of the subdivisions for each stage can represent a particular variable, for example a type of information. The subdivisions can be populated with information that relates to the correct variable. The mind palace thus organizes information in a manner that is more useful to the human mind. The mind palace can be displayed such that it can be explored by a user because the physical or digital instantiation can be visualized by the user.

In an example the temporal aspects include past, present, and future stages, and the spatial aspects include back, present location, and forward stages. In an example each volume comprises five separate micro-level sub-volumes along or parallel to each of x, y, and z mutually orthogonal axes. In an example the separate sub-volumes for each representation of the z axis comprise interest, goals, strategy, tactics, and execution, the separate sub-volumes for each representation of the y axis comprise concept elements, lesson competencies, curricula, catalog content, and library collection, and the separate sub-volumes for each representation of the x axis comprise individual, social, organizational, political, and civilizational.

The axis may be the z axis. Each division or macro-level volume can represent both a temporal aspect and a spatial aspect. Each division or volume can be subdivided into a number of separate micro-level subdivisions or sub-volumes organized along or parallel to x, y, and z mutually orthogonal axes of the division or volume, where there are the same quantity of separate subdivisions or sub-volumes in each division or volume. This results in a conceptual framework. Each of the subdivisions for each division can represent a particular variable, for example a type of information. The subdivisions can be populated with information that relates to the correct variable. The mind palace thus organizes information in a manner that is more useful to the human mind. The mind palace can be displayed and mentally visualized such that it can be explored by a user.

A mind palace can further consist of visual representations of multiple macro-level divisions and organizations (which may be visualized as volumes), located along x and y mutually orthogonal axes, respectively. Such a visual representation can be created by placing visual representations of multiple separate divisions along an x axis, placing visual representations of multiple separate organizations (layers) along a y axis that is orthogonal to the x axis, creating, from these visual representations a two-dimensional x-y knowledge platform comprising a plurality of separate volumes, one volume at each intersection of the multiple representations along each of the two axes, and displaying the two-dimensional knowledge platform. Each of the subdivisions for each division and organization can represent a particular variable, for example a type of information. The subdivisions can be populated with information that relates to the correct variable. The mind palace thus organizes information in a manner that is more useful to the human mind. The mind palace can be displayed such that it can be explored by a user because the physical or digital instantiation can be visualized by the user.

In an example the multiple separate divisions along the x axis comprise humanity, creativity, and technology. In an example the multiple separate layers along the y axis comprise memory, awareness, and imagination. In some examples the method further includes, for each of the separate volumes, defining a plurality of separate micro-level sub-volumes organized along or parallel to x, y, and z axes of the volume, wherein each volume comprises the same quantity of separate sub-volumes. In an example each volume comprises five separate sub-volumes along or parallel to each of x, y, and z mutually orthogonal axes. In an example the separate sub-volumes for each representation of the z axis comprise interest, goals, strategy, tactics, and execution, the separate sub-volumes for each representation of the y axis comprise concept elements, lesson competencies, curricula, catalog content, and library collection, and the separate sub-volumes for each representation of the third axis comprise individual, social, organizational, political, and civilizational.

A full three-dimensional mind palace can be created by placing visual representations of multiple separate macro-level stages along a z axis, wherein each stage represents a temporal aspect and a spatial aspect, placing visual representations of multiple separate macro-level divisions along an x axis that is orthogonal to the z axis, placing visual representations of multiple separate macro-level layers along a y axis that is orthogonal to the x and z axes, creating, from these visual representations a representation of a three-dimensional mind palace structure comprising a plurality of separate volumes, one volume at each intersection of the multiple representations along each of the three axes, and displaying the three-dimensional mind palace.

In an example the temporal aspects comprise past, present, and future, and the spatial aspects comprise back, present location, and forward. In an example the method further includes, for each of the separate volumes, defining a plurality of separate micro-level sub-volumes organized along or parallel to x, y, and z axes of the volume, wherein each volume comprises the same quantity of separate sub-volumes. In an example each volume comprises five separate sub-volumes along or parallel to each of x, y, and z mutually orthogonal axes. In an example the separate sub-volumes for each representation of the z axis comprise interest, goals, strategy, tactics, and execution, the separate sub-volumes for each representation of the y axis comprise concept elements, lesson competencies, curricula, catalog content, and library collection, and the separate sub-volumes for each representation of the x axis comprise individual, social, organizational, political, and civilizational.

FIG. 1 illustrates a one-dimensional visual representation 10 of a conceptual framework for information along the z axis comprising three volumes 12, 14, and 16. Visual representation 10 can be created using computer system 80, FIG. 6, by placing visual representations 12, 14, and 16 of multiple (in this case, three) separate macro-level stages (z1, z2, and z3) in a plurality of separate volumes along an axis, wherein each stage represents a temporal aspect and a spatial aspect. Then for each of the separate volumes 12, 14, and 16, a plurality of separate micro-level sub-volumes organized along or parallel to x, y, and z mutually orthogonal axes of the volume are defined. Sub-volumes are further detailed in FIG. 4A. This creates conceptual framework 10. In an example, each of volumes 12, 14, and 16 includes the same quantity of separate sub-volumes. In an example there are 5×5×5 or 125 sub-volumes in each volume. The conceptual framework is then displayed. Information that can be associated with each volume and sub-volume in order to create a useful mapping of information is explained in more detail below. In an example the temporal aspects comprise past, present, and future, and the spatial aspects comprise back, present location, and forward.

Figure 2:
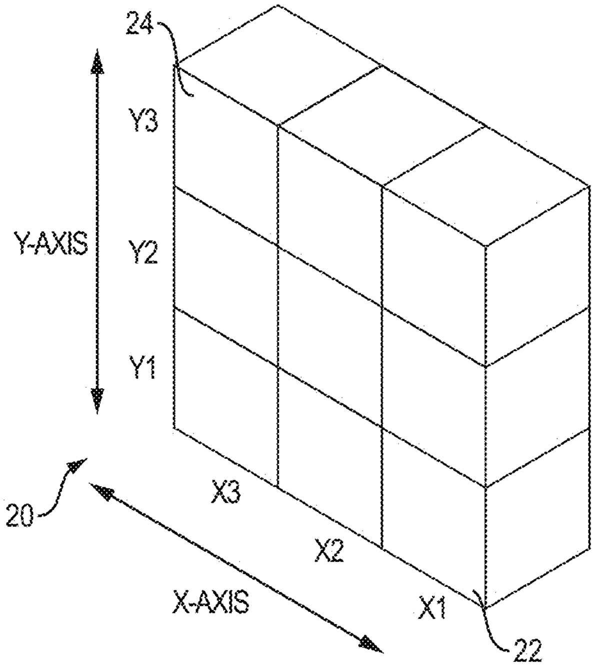
FIG. 2 illustrates a two-dimensional visual representation of a conceptual framework for information along the x and y axes.

FIG. 2 illustrates a two-dimensional visual representation 20 of a conceptual framework for information along the x and y axes. Visual representation 20 can be created using computer system 80, FIG. 6, by placing visual representations of multiple separate macro-level divisions (x1, x2, and x3) along an x axis and placing visual representations of multiple separate macro-level layers (y1, y2, and y3) along a y axis that is orthogonal to the x axis. A representation of a two-dimensional x-y knowledge platform is created from the visual representations, comprising a plurality (in this case, nine) of separate volumes, one volume at each intersection of the multiple representations along each of the two axes. For the sake of simplicity, only volume 22 (at x1, y1) and volume 24 (at x3, y3) are numbered. The two-dimensional knowledge platform is then displayed. In an example the multiple separate divisions along the x axis comprise humanity, creativity, and technology. In an example the multiple separate layers along the y axis comprise memory, awareness, and imagination. Then for each of the nine separate volumes a plurality of separate micro-level sub-volumes organized along or parallel to x, y, and z mutually orthogonal axes of the volume are defined. Sub-volumes are further detailed in FIG. 4A. This creates conceptual framework 20. In an example, each of the nine volumes includes the same quantity of separate sub-volumes. In an example there are 5×5×5 or 125 sub-volumes in each volume. The conceptual framework is then displayed. Information that can be associated with each volume and sub-volume in order to create a useful mapping of information is explained in more detail below.

Figure 3:
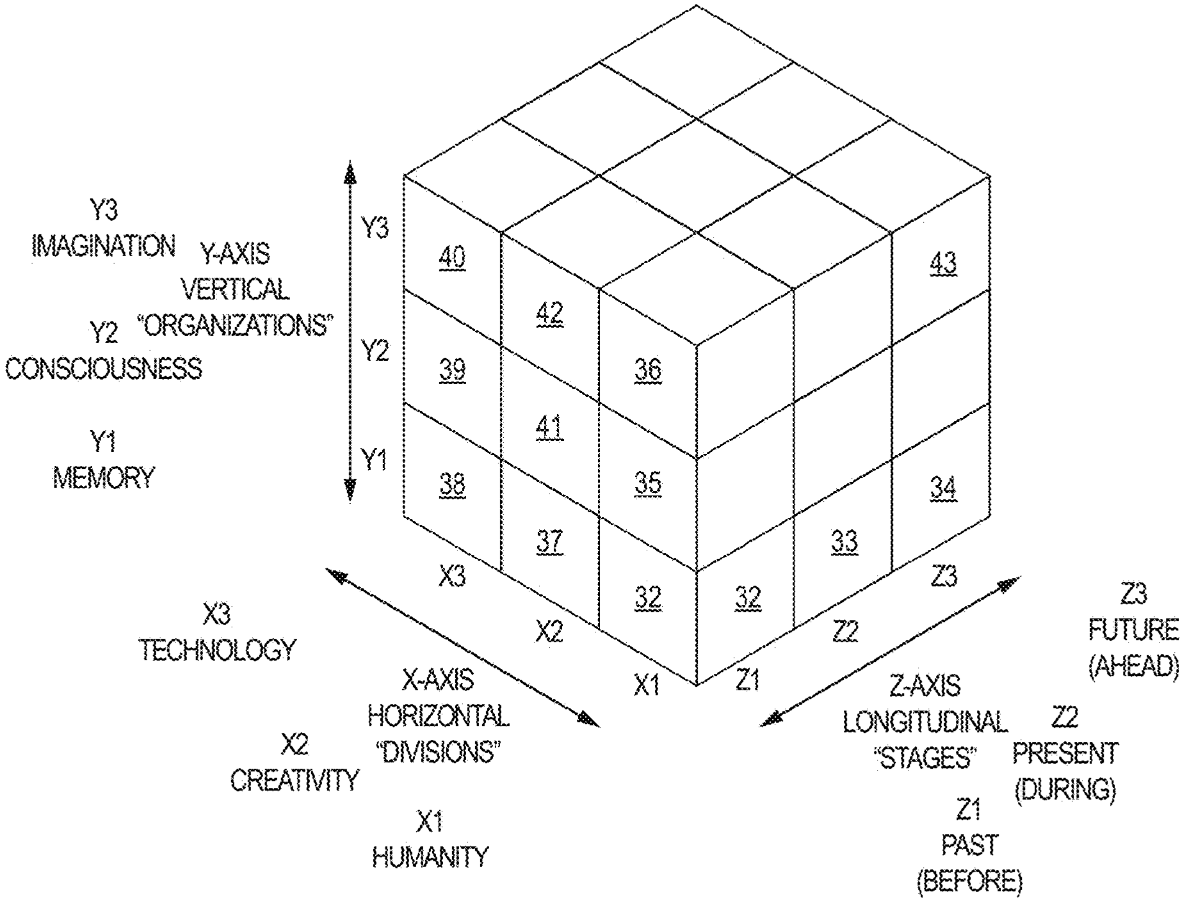
FIG. 3 illustrates a three-dimensional visual representation of a conceptual framework for information along the x, y, and z axes.

FIG. 3 illustrates a three-dimensional visual representation 30 of a conceptual framework for information along the x, y, and z axes that in some respects represents a combination of the x and y axis representation of FIG. 2 considered along the z axis representation of FIG. 1. Visual representation 30 can be created using system 80, FIG. 6. Visual representation 30 can be created by placing visual representations of multiple separate steps (stages) along a z axis, wherein each stage represents a temporal aspect and a spatial aspect, placing visual representations of multiple separate divisions along an x axis that is orthogonal to the z axis, and placing visual representations of multiple separate layers or organizations along a y axis that is orthogonal to the x and z axes. From these visual representations a representation of a macro-level three-dimensional mind palace structure 30 is created, comprising a plurality of separate volumes, one volume at each intersection of the multiple representations along each of the three axes. In this example there are three representations along each of the three axes so there are 27 separate volumes (with only volumes 32-43 numbered for the sake of simplicity). Three-dimensional mind palace 30 is then displayed. In an example, the temporal aspects along the z axis comprise past, present, and future, and the spatial aspects comprise back, present location, and forward.

In an example, for each of the separate volumes a plurality of separate micro-level sub-volumes are defined organized along or parallel to x, y, and z axes of the volume, wherein each volume comprises the same quantity of separate sub-volumes. In an example each volume comprises five separate sub-volumes along or parallel to each of x, y, and z mutually orthogonal axes, wherein each sub-volume represents an aspect or principle. In an example the separate sub-volumes for each representation of the z axis comprise the following five aspects: interest, goals, strategy, tactics, and execution. In an example the separate sub-volumes for each representation of the y axis comprise five aspects organized from concrete to abstract, namely: concept elements, lesson competencies, curricula, catalog content, and library collection. In an example the separate sub-volumes for each representation of the x axis comprise five aspects organized from one to many, namely: individual, social, organizational, political, and civilizational.

Figure 4:
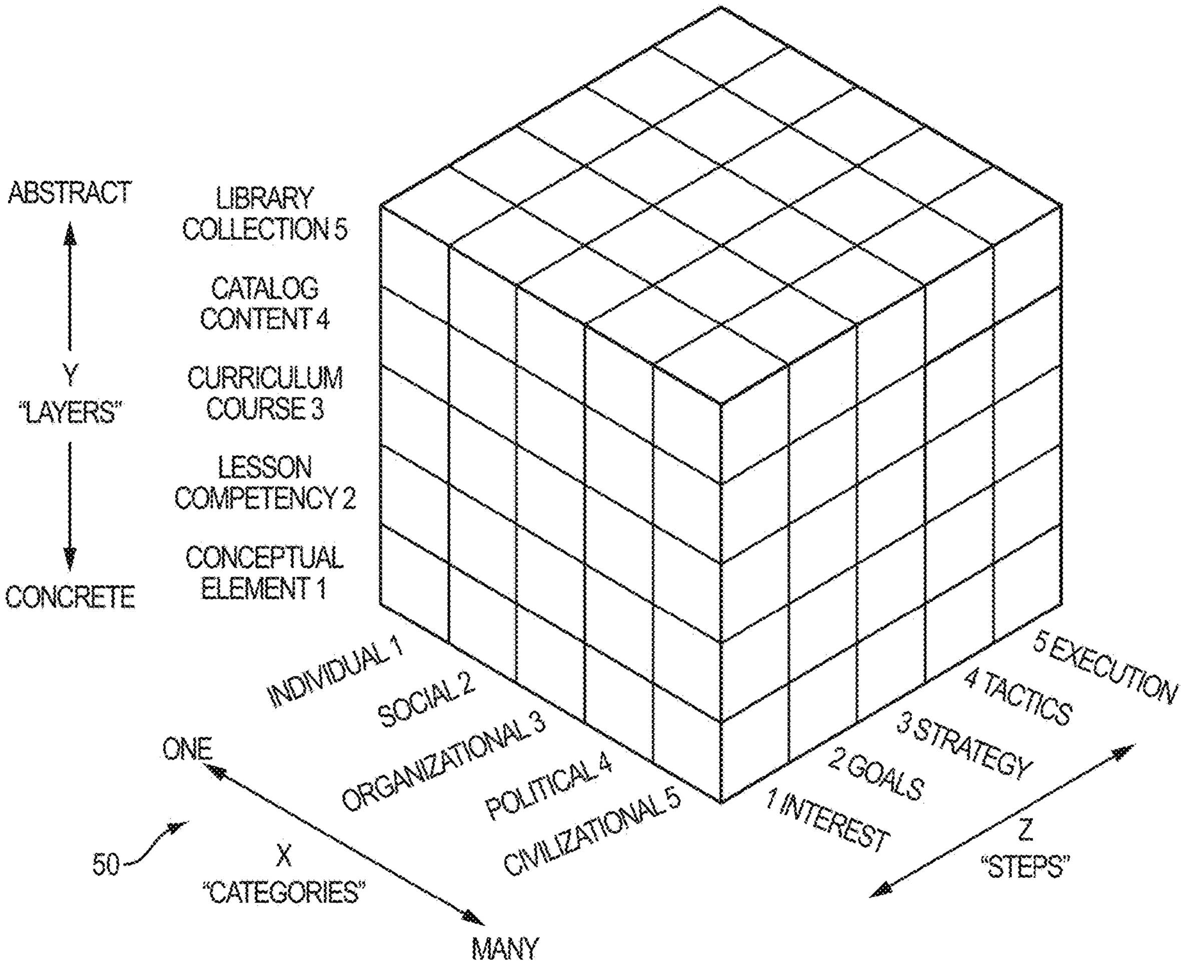
FIG. 4 illustrates a five by five by five sub-volume division of a volume of the visual representation illustrated in FIG. 3.

FIG. 4 illustrates a five by five by five micro-level sub-volume division 50 of any one of, or each of, the 27 volumes of the visual representation 30 illustrated in FIG. 3. As described above, in an example each volume comprises five separate sub-volumes along or parallel to each of x, y, and z mutually orthogonal axes. In an example illustrated in FIG. 4A the separate sub-volumes for each representation of the z axis (labelled 1-5) comprise the following steps: interest, goals, strategy, tactics, and execution, the separate sub-volumes for each representation of they axis (labelled 1-5) comprise the following principles or layers (ordered from concrete to abstract): concept elements, lesson competencies, curricula, catalog content, and library collection, and the separate sub-volumes for each representation of the x axis (labelled 1-5) comprise the following principles or organizations (ordered from one to many): individual, social, organizational, political, and civilizational.

Figure 5:
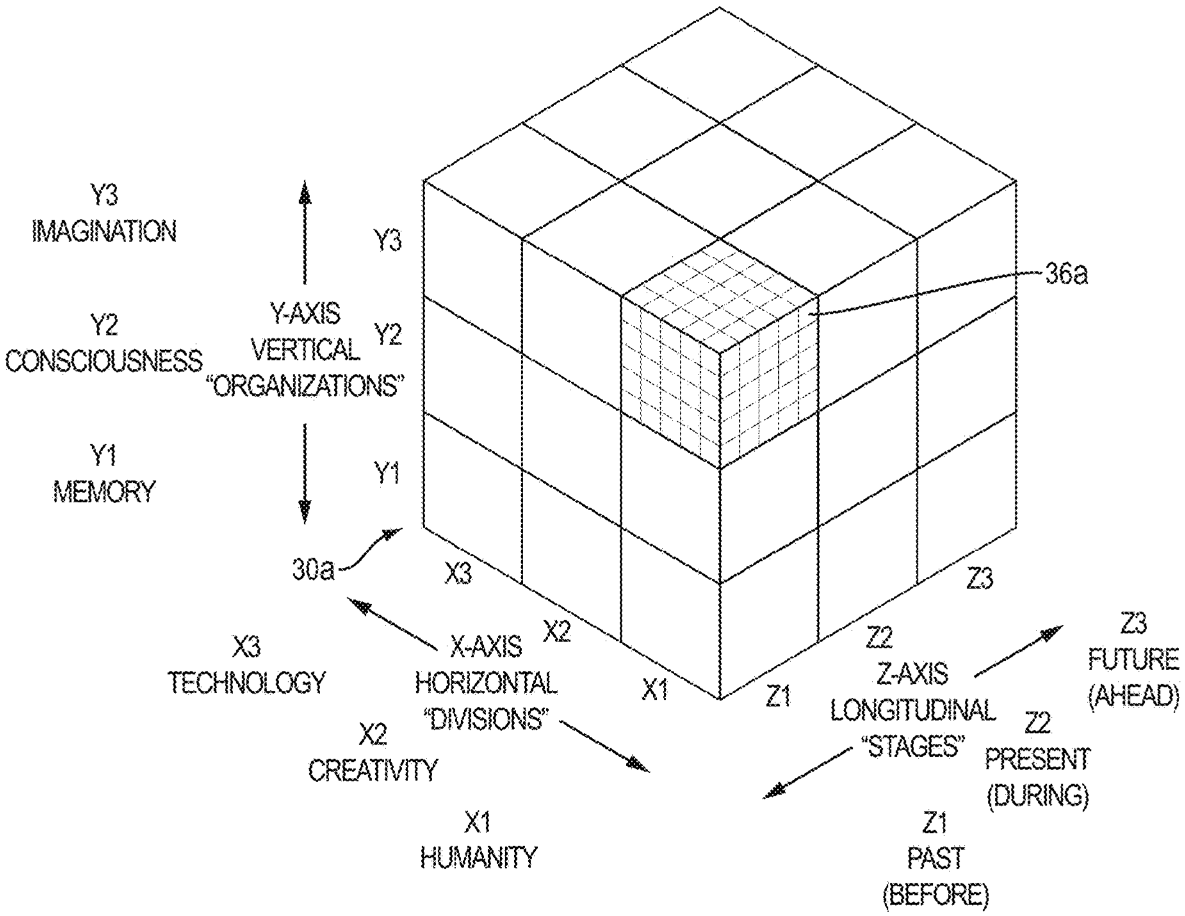
FIG. 5 illustrates a three-dimensional visual representation of a conceptual framework for information similar to that of FIG. 3, detailing micro-level sub-volumes of one of the volumes.

FIG. 5 illustrates a three-dimensional visual representation of a conceptual framework for information 30*a* similar to that of FIG. 3, but detailing the 125 micro-level sub-volumes of one of the volumes 36*a*. Labelling of the three z axis stages (past or before, present or during, and future or ahead), the three x axis divisions (humanity, creativity, and technology), and the three y axis organizations (memory, awareness, and imagination), is indicated in the figure.

Figure 6:
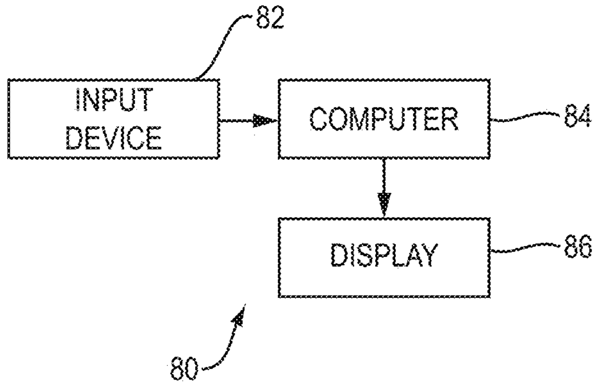
FIG. 6 is a functional block diagram of a system that can be used in the presently disclosed methods.

FIG. 6 is a functional block diagram of a system 80 that can be used in the presently disclosed methods. System 80 includes a standard computer 84 (e.g., a desktop or a cloud server, with a processor and associated memory), an input device (e.g., a keyboard and mouse) and a display device 86 (e.g., a monitor). Software residing in and run on computer 84 can be used to accomplish the described methods and the associated displays on device 86. Each of the input, processing and output operations can use the display as a means to convey information to the user.

Figure 7:
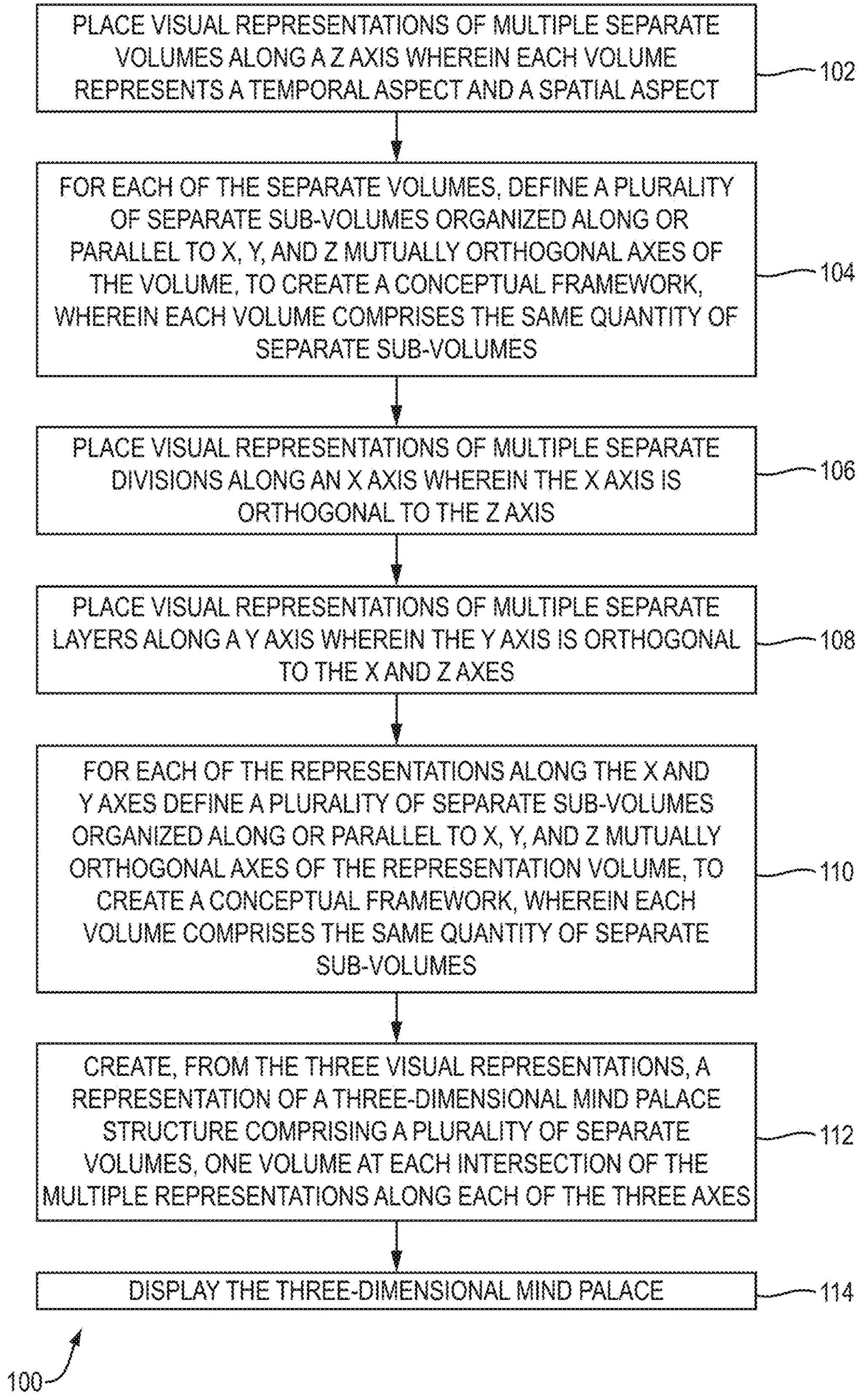
FIG. 7 is a flowchart illustrating methods of the present disclosure.

FIG. 7 is a flowchart that illustrates method 100 that can be accomplished using system 80, particularly with the computer processor, the input device and the display device. As described elsewhere herein, not all of the steps of method 100 are necessarily required in every case. In step 102 the processor is configured to place visual representations of multiple separate volumes along a z axis, wherein each volume represents a temporal aspect and a spatial aspect. In step 104, for each of the separate volumes a plurality of separate sub-volumes organized along or parallel to x, y, and z mutually orthogonal axes of the volume are defined by the processor, to create a conceptual framework, wherein each volume comprises the same quantity of separate sub-volumes. In step 106, visual representations of multiple separate divisions are placed along an x axis using the processor and display, wherein the x axis is orthogonal to the z axis. In step 108 visual representations of multiple separate layers or organizations are placed along a y axis using the processor and display, wherein the y axis is orthogonal to the x and z axes. In step 110, for each of the representations along the x and y axes, a plurality of separate sub-volumes are defined using the processor and display, and organized along or parallel to x, y, and z mutually orthogonal axes of the representation volume, to create a conceptual framework, wherein each volume comprises the same quantity of separate sub-volumes. In step 112 the processor is configured to create, from the three visual representations, a representation of a three-dimensional mind palace structure comprising a plurality of separate volumes, one volume at each intersection of the multiple representations along each of the three axes. At step 114 the processor is configured to display the three-dimensional mind palace on display device 86. Further details are given below. These enumerated steps are provided to explain definitively the procedure but are not necessarily included in the invention.

Figure 8A:
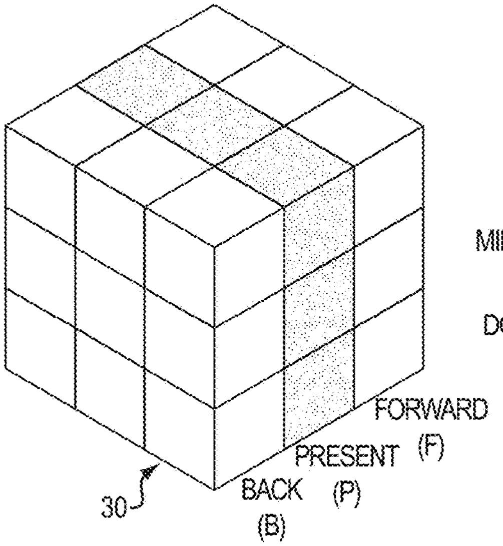
FIGS. 8A-8F schematically illustrate steps involved in an example of populating the three-dimensional visual representation of a conceptual framework for information of FIG. 3.

FIGS. 8A-8F schematically illustrate steps involved in an exemplary population with information/data of the three-dimensional visual representation of a conceptual framework for information of FIG. 3. FIG. 8A illustrates the representation 30, with the volumes of the “present” stage of the z axis highlighted. The Z Axis (at the macro-level) presents the time frame, described as a past, present, and future "time frame" while it can also be interpreted like looking back to history (back, or past), current reflection (present), and planning ahead/looking ahead (future or forward). Hence the temporal aspect of this axis.

Figure 8B:
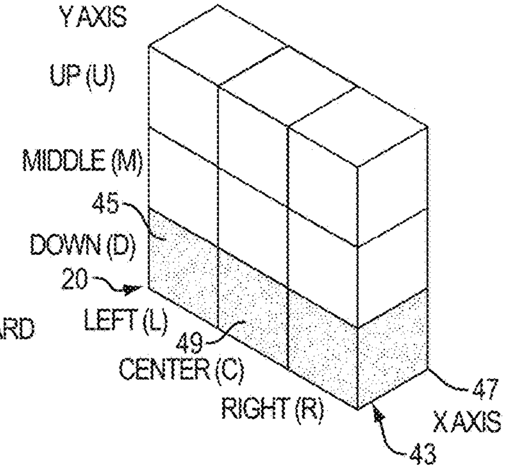

The corresponding x-y macro-level representation 20 is illustrated in FIG. 8B. FIGS. 8A-8E also introduce an alphanumeric naming convention for the volumes and sub-volumes that can be used to uniquely identify the location of each volume and sub-volume. The locations correspond to the subject matter of information that is placed into the volumes and sub-volumes. For this exemplary naming convention, where the representation is mapped to the mind, the z axis stages/volumes are labelled back (B), present (P), and forward (F), the x axis divisions/volumes are labelled center (C). left (L) and right (R), and the y axis organizations/volumes are labelled middle (M), down (D), and up (U). The origin of representation 30 is in the exact center, which is in the center of the one volume of the 27 total volumes that is at the intersection of zP, xC, and yM.

The "dashboard-like" interface 20, FIG. 8B, is displayed to the user, made by the X and Y axes that forms a plane (interface 20 may be considered to be a "knowledge platform"). Interface 20 is displayed on the macro-level as a 3×3 matrix with three broad divisions along the x axis, and three broad layers or organizations along the y axis. Any one volume or group of volumes can be selected by the user using an input device such as a mouse or touch-screen. In this case row 43 (highlighted in FIG. 8B) is selected for purposes of this exemplary illustration, although it should be understood the illustrated steps will normally be applied (sometimes through multiple iterations as further described elsewhere herein) to all of the 27 volumes; the population of less than the entirety of the 27 volume representation is illustrated for the sake of simplicity. Row 43 includes the three volumes of the x axis that are at the yD location, volumes 45, 47, and 49.

Figure 8C:
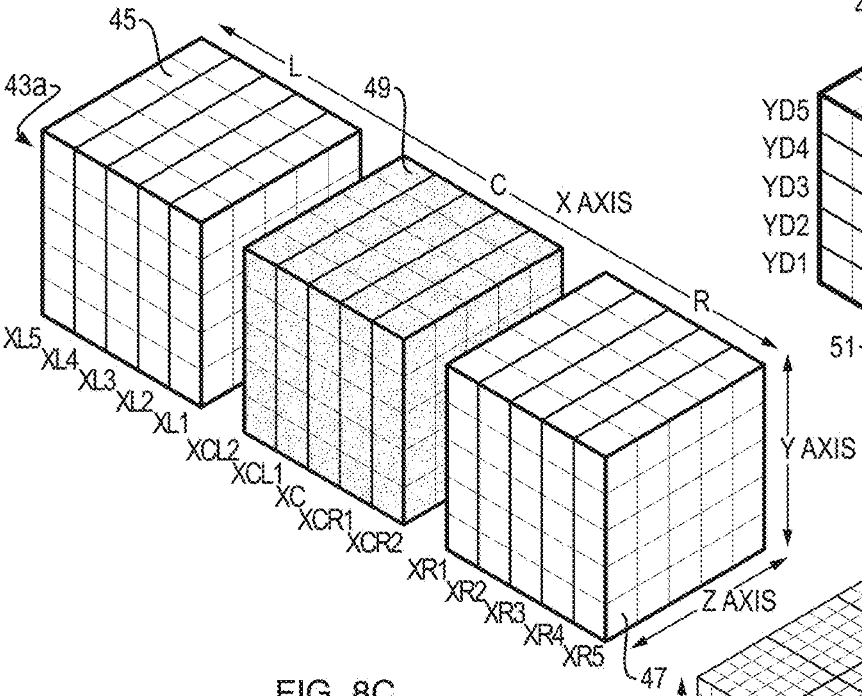

Row 43 is further illustrated in FIG. 8C, where it has been broken down into the five x axis sub-volumes on the micro-scale (sometimes termed "categories") of each of the three volumes L (45), C (49), and R (47). The row is labelled as 43*a* because it specifies and illustrates the labeling of the five sub-volumes of each volume. The labelling reflects both the macro and micro levels and begins at the x location that corresponds to the origin of the representation, at the middle of the five sub-volumes of the center volume 49, and so is labelled xc. Moving to the left, the next sub-volumes are xcl1 (1 standing for left of center) and xcl2. In the adjacent volume 45 at LD the numbering of the sub-volumes restarts at 1 to reflect the five sub-volumes, and goes from xl1 to xl5. Similarly, to the right of xc are xcr1 (r standing for right) and xcr2. The sub-volumes in volume 47 are xr1-xr5.

Figure 8D:
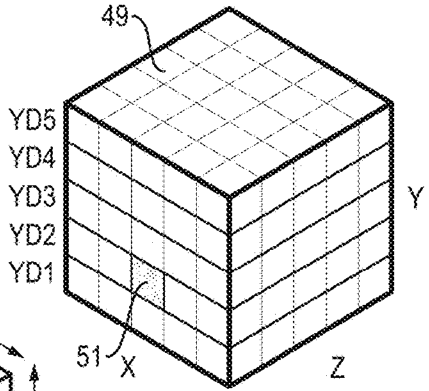

Volume 49 is illustrated in FIG. 8D with its five y axis micro "layers." The labelling reflects both the macro and micro levels. Since volume 49 at the macro level is in position D, and this is the y axis, all layers are labelled yd, with the numbers 1-5 running from bottom to top. For the middle volume on the y axis the labelling convention would be ym1-5.

Figure 8E:
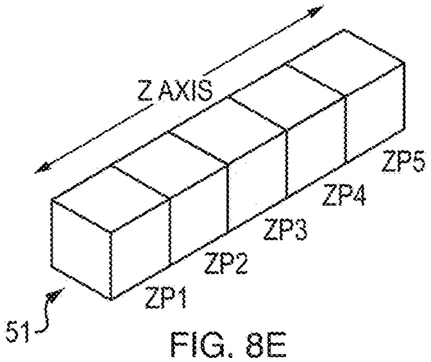

FIG. 8E illustrates the labelling convention of the five micro aspects or steps along the z axis of each volume. Location 51 (at xc//yd2 of volume 49 (where "//" is used to separate the micro-volumes)) is expanded along the z axis. The numbering runs 1-5, from back to forward. The stage on the z axis is present, or p. Thus the five steps are labelled zp1-zp5.

Figure 8F:
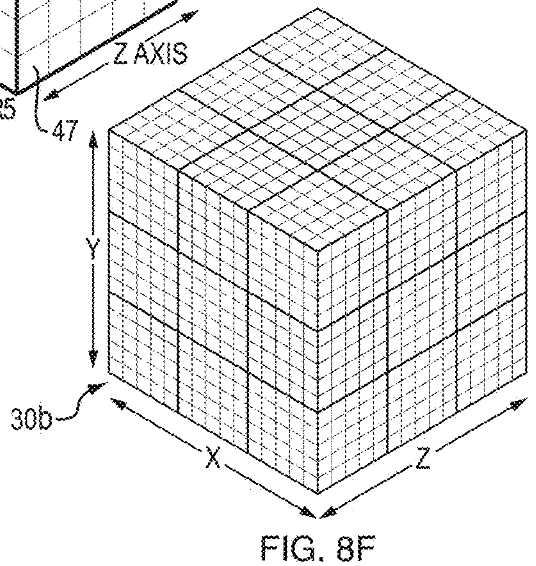

The entire 3×3×3×5×5×5 (3,375 sub-volume) representation or Mind Palace 30*b* is illustrated in FIG. 8F. It is labelled 30*b* rather than 30 because representation 30, FIG. 3 and FIG. 8A, does not detail the micro-level sub-volumes.

Mind Palace 30*b* can include up to 5×5×5×27 or 3,375 sub-volumes, each of which can contain information relating to the principles and time frame/location associated with each sub-volume. Once the mind palace is populated with data (to an extent required) it is complete. A user can then use the mind palace as desired, with examples described below. In an example the presence of data at any volume or sub-volume can be indicated in the display through text, hue, and/or shades (or some other form of visual "cue"). The physical or digital representation of the Mind Palace can be held in the mind as visual or mental representations by focused observation by reducing it to a form that a human can see and learn. The Mind Palace can be used as a common denominator, pattern-recognition user interface. As a three-dimensional representation, the Mind Palace can become an architecture for humanity, creativity, and technology.

EXAMPLES

In a general sense in an example the mind palace or representation can be used as follows. The whole system consists of seven phases—input (phase 1), five phases of process (phases 2-6), and output (phase 7). The input can consist of the user assembling information, knowledge, data or whatever else is to be mapped and used, using the three axes and the labelling of their volumes and sub-volumes as a guide. The z axis comprises three stages each comprising five steps such as interest, goals, strategy, tactics, and execution. The x axis comprises three divisions each comprising five categories organized from one to many, such as individual, social, organizational, political, and civilizational (or their semantic equivalents). The y axis comprises three organizations each comprising five layers organized from concrete to abstract, such as concept elements, lesson competencies, curricula, catalog content, and library collection (or their semantic equivalents).

Figure 9B:
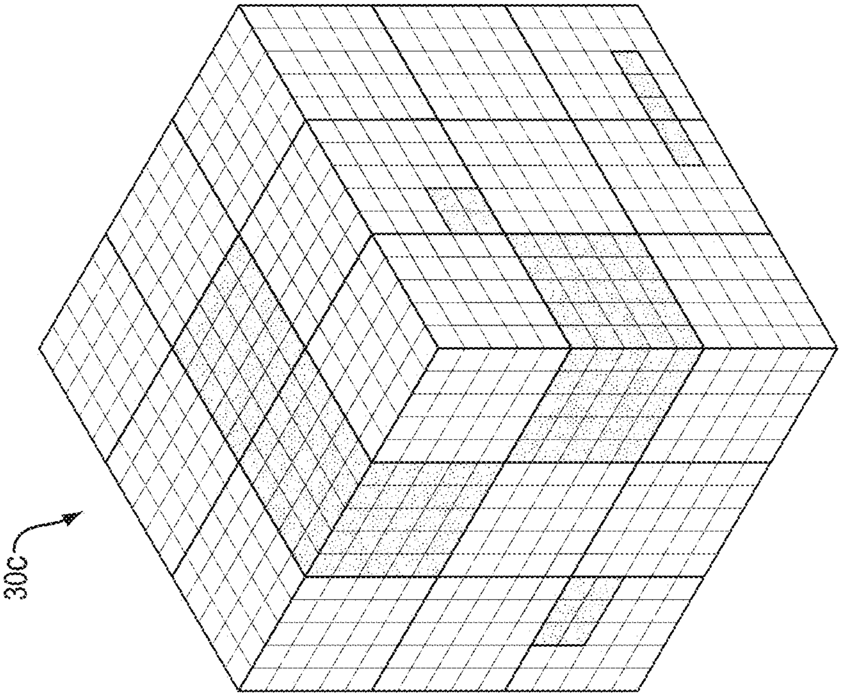
FIGS. 9A, 9B, 9C, and 9D illustrate a three-dimensional visual representation of a conceptual framework for information along the x, y, and z axes unpopulated with data (FIG. 9A) and partially populated with data (FIGS. 9B-9D).
Figure 9A:
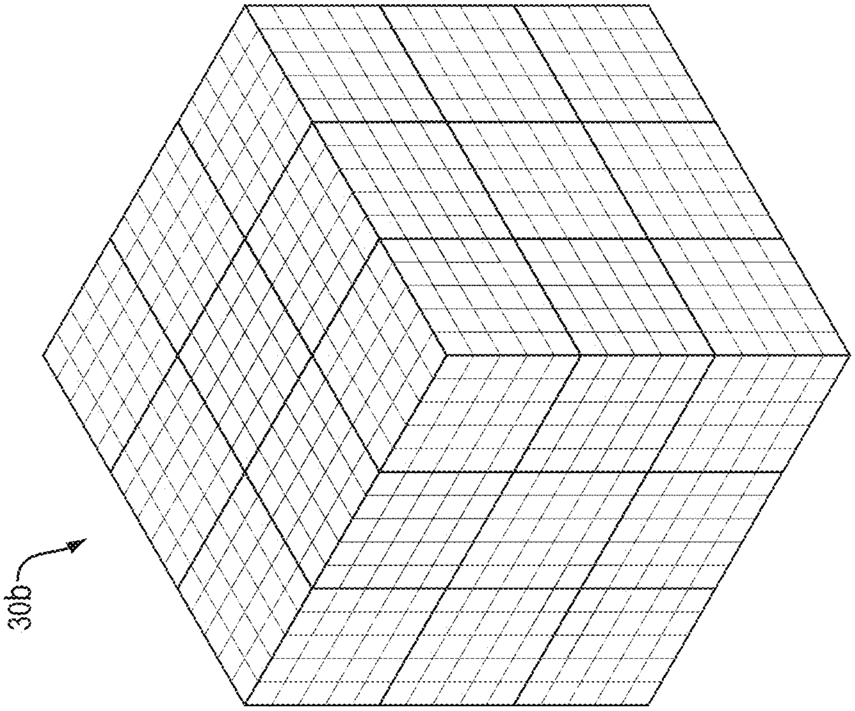
Figure 9D:
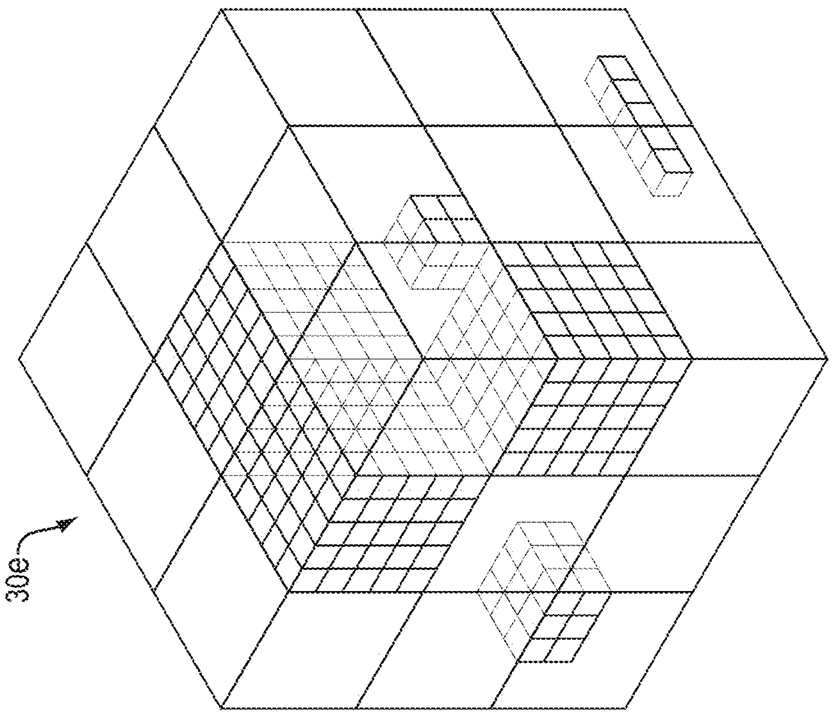
Figure 9C:
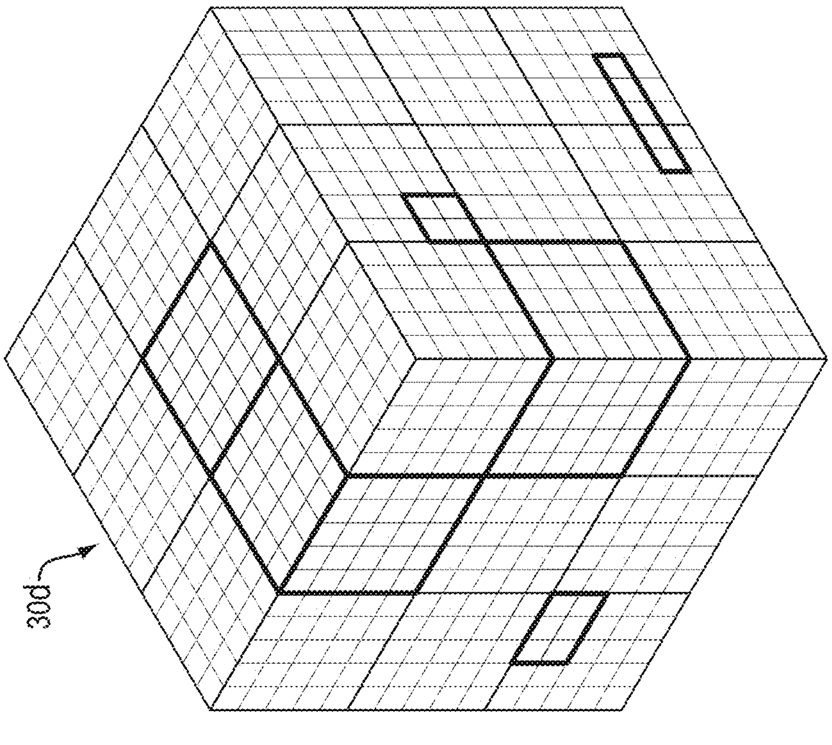

The process (phases 2-6) can include analysis protocol (phase 2), design platform (phase 3), development palace (phase 4), implementation/practice (phase 5) and evaluation/proof (phase 6). In phase 2 the information is sorted along the z axis—it is staged and sequenced to steps. In phase 3 the information is positioned along the x and y axes in a knowledge platform; see FIG. 8B. The positioning along the x axis is by divisions (macro) and categories (micro), while the positioning along the y axis is by organizations (macro) and layers (micro). This creates a 3D mind palace display, phase 4. In the implementation/practice phase 5 the display of the cube can be colored, shaded, or changed in some other visual aspect in order to indicate volumes and sub-volumes that are currently populated. This could be accomplished using a database with 3,375 entries, one for each sub-volume, and using the processor to determine which entries are populated with data or information and then automatically visually changing the display for the corresponding sub-volume, e.g., by shading it or coloring it. See, e.g., FIGS. 9A, 9B, 9C, and 9D, where FIG. 9A illustrates a display of an unpopulated cube 30*b* wherein all volumes and sub-volumes are unshaded, indicating they are not populated. FIG. 9B illustrates a partially populated cube 30*c* wherein shaded volumes and sub-volumes are populated and unshaded ones are not.

The indication of population of cubes and sub-cubes can be accomplished in any desired manner, using any possible visual cue (shading and color being two of many possible choices). Two additional examples are illustrated by cube 30*d*, FIG. 9C and cube 30*e*, FIG. 9D. In cube 30*d* populated cubes/sub-cubes are designated using thicker lines around the particular volume(s) while in cube 30*e* the cube is displayed as "transparent" so that the sub-volumes and internal boundaries between volumes and sub-volumes that are populated or not (designated again by thicker boundary lines) are visible.

Having a visual "cue" will reinforce the visual representation aspect of the disclosure. Different people would be able to indicate different knowledge/information using different visual cues, which would result in different unique display patterns that provided additional information to the user of the cube.

Also, the visual cues can be used to indicate how densely populated a particular volume is—in other words showing how much information a single volume contains (e.g., lighter shading for less densely populated volumes (i.e., less information) compared to more opaque for more densely populated volumes (i.e., more information).

By visually indicating population information the user is thus able to visualize what information is included and use that to develop/gather more information, and to share with others who are involved with the current effort. The display can take other forms in order to provide visual cues. For example, the shading or coloration can be more generalized than on a sub-volume by sub-volume basis. For example, volumes that are more populated than others can be indicated visually, to give the user a sense of the whole.

In phase 6, evaluation/proof, the user is able to select any volume/sub-volume or ranges thereof (e.g., by selecting them using a mouse) and the corresponding information can be retrieved and displayed. This allows any user or collaborator to dive into the mind palace and review and use its information, as well as augment it by changing information associated with a volume or sub-volume, or providing missing information that can help to present a fuller or clearer picture of the problems or situations that are being addressed using the mind palace. Phase 7 (output) can consist of the types of displays discussed above, where populated and unpopulated portions of the cube are indicated.

The seven phase whole system lends itself to iteration through repetitive utilization of the seven phases. The output visualizes pre-sorted data on each axis and allows a user to focus on unpopulated volumes/sub-volumes for the next iteration/learning objective. A result can be a 3D mapping of information that is relevant to an issue that can be remembered and used as described above.

An example of the usefulness of an application of The Whole System incorporates a visual representation of the conceptual framework to be configured in accordance with instructional systems design process that is now an international standard. The process of Analyze, Design, Develop, Implement, and Evaluate (ADDIE) can be visualized as part of systems analysis in terms of usefulness. The criterial attributes for concepts of usefulness are: problems to be solved, need, feature, benefit, proof and advantages—with positive and negative examples.

Plan/Input—How can The Whole System be used to visualize the plan for input of a training program?

To plan an instructional system, all source content in every form can be assembled, the target audience identified, and training requirements specified. This content as digital data can be allocated to the conceptual framework through the phases of transformation into a learning system to result in the output of behavioral performance.

1. Need: the overabundance of information must be organized to be useful.
2. Features: the 3D framework provides structure to populate the ideational scaffolding.
3. Benefits: the common denominator framework has a place for everything to be put in its place.
4. Proof: in the digital age, everyone is overwhelmed with over-choice.
5. Advantages: this tool inventories content that sets the stage for phased transformation.

Analyze—How to sequence skills that can be staged over time and space, with problem solving steps?

The Macrostructure and Microstructure provide visual representation templates to deconstruct content into processes and skills.

1. Need: conceptual skills need to be put in an operational order that corresponds to on the job use.
2. Features: the stages and steps will be sequenced spatially and temporally in a problem solving sequence.
3. Benefits: this means that skills concepts will be learned and remembered in the same sequence that they are likely to be applied.
4. Proof: learning about content in a scattered and redundant format is difficult to translate into performance in the real world to generate healthy habits for better outcomes.
5. Advantages: standardized sequence process skills will overcome the lack of a process for learning by absorbing content from unstructured sources that are digitized, but not conceptualized.

Design—How can knowledge in organizations in layers from abstract to concrete and divisions in categories be determined to meet the requirements of skills process training?

A task analysis of required steps can identify the related knowledge and data necessary for each step in the process to lead to effective and efficient performance of the task. As a Y Axis example, the identified necessary concepts can be aggregated and integrated in layers beginning with concept elements, then lesson competencies, then courses and curricula, then into catalogs, and finally into a collection library. The deconstructed content results in an allocation along the Y Axis and for population on the categories X Axis.

1. Need: a visual representation of deconstructed conceptual knowledge.
2. Features: each layer and category is interfaced with the adjacent locations.
3. Benefits: people will be able to deconstruct knowledge into component understandings.
4. Proof: dictionaries do not provide an understanding with the criterial attributes and positive and negative examples that the conceptual framework will offer.
5. Advantages: the knowledge platform as a two dimensional framework will allow the assembly of knowledge that can be discriminated vertically—concrete to abstract, and horizontally—one to many.

Develop—How to develop the identified necessary knowledge and skills into a performance learning training program that shows the relationship among all elements with learning experiences that can be delivered over time as activities and evaluated at many locations over time and place?

The Mind Palace combines the Z Axis+X-Y Axis into a Whole Brain 3D Conceptual Framework that shows the relationship of skills processes, knowledge organization and division in context. Compiles information from all three axes, sorted from two previous phases, to display the three dimensional framework. Case problems, interactive acquisition and application interventions can be created in any mode, medium, method, and means of instructions. The Whole System can be geared to the specific training of an individual participant and include the full complement of collaborative possibilities along the X Axis for Technology, Humanity, and Creativity, along the Y Axis for Knowledge, Consciousness, and Imagination, and on the Z Axis for Past, Present, and Future.

1. Need: a common denominator structure for all content so that the framework can be reused and repurposed.
2. Features: a framework mapped to the brain and the thinking process and preferences, yielding perspectives of a pattern recognition user interface.
3. Benefits: development of a structure that represents a new frame of mind for information and instruction that can be modular, mixed and matched.
4. Proof: the vast amount and chaos of concepts that lack a content are difficult to interpret.
5. Advantages: The Whole System will make training systems interchangeable and learning easier to integrate with prior and future competencies of knowledge, skills, and performance.

Implement—How can training be delivered in different locations over time to effectively and efficiently deliver information into conceptual knowledge skills and performance?

Training is implemented through classes, workshops, lessons, or in any learning environment known, and the progress of populating The Mind Palace is tracked over time. This process will give insights on the sequence in which learning/information/data/knowledge is acquired within each practice. The invention can deliver training into variety of settings as pre-work, workshops in class, and post-work on the job. Delivery is tailored to the learner's prior experience preferences and expertise with existing participant knowledge in a common denominator conceptual framework to build competencies over time.

1. Need: instructional system that is flexible, efficient, and effective for course leaders and participants.
2. Features: the framework can be used for visual inventory of progress for each student over succeeding training sessions.
3. Benefits: participants will be able to build on existing learning that will continue to grow.
4. Proof: people can have difficulty answering the question with any comprehensiveness "what's on your mind?" or in terms of the conceptual framework, "what is your mind on?"
5. Advantages: the conceptual framework will provide a tool for continuous lifelong learning that can be built, stored, and used mentally, physically, and virtually.

Evaluate—How can knowledge skills and performance of conceptual learning objectives be measured and different learning, goals, strategies, and tactics be assessed?

The same visual representation in The Whole System conceptual framework used in the instructional system design process is brought forward as Plan, Analyze, Design, Develop, and Implement. The same framework can be used to evaluate knowledge skills and performance at intervals in application exercises, tests, and examinations. The representation shows the macro and micro structure where past is used for pre-requisite testing for what the learner already knows (requirements for the course), and present is used for pre-test to assess the current competency of the learner prior to the course. Post-test is used for assessment of the completion status of competence overall after completing the course.

1. Need: to have tools for continual performance evaluation by the learner and others in keeping with the requirements.
2. Features: the conceptual framework can be populated with accumulative results of every phase of the instructional system design process.
3. Proof: participants and instructors will know what they know, know what they don't know, and know that they don't know. Learners will have a tool that improves their ability for lifelong learning with confidence in their own competence.

Maintenance/Output—The Whole System is a systematized, standardized, symmetrical, shareable, and simplified visual representation of the instructional system process with a Whole Brain Conceptual Framework that can lead to a paradigm shift in the way that the world learns. Users can take charge of learning over the lifespan for better health and find a way to take charge of the exponentially accelerating information explosion in artificial intelligence.

Results from this phase, displaying what knowledge was acquired (populated cubes) and what more can be acquired (unpopulated cubes), is an exemplary input for the next iteration as well as a maintenance tool to keep track of the performance.

Maintenance—provides a starting point for the new state of understanding where raw digital information has been transformed into behavioral performance for continuing learning.

One non-limiting illustrative example of how the system and method can be used is as follows:

Origin—Starting point. Central point of each axis.
- X—Center
- Y—Middle
- Z—Present Indicated by 3 aspects—What Axis?, Direction?, Interval?
1. Axis—X, Y, and Z
2. Direction (Macro level)
   - X—Left (L), Center (C), Right (R)→(Divisions) Technology, Creativity, Humanity
   - Y—Down (D), Middle (M), Up (U)→(Organizations) Memory, Consciousness, Imagination
   - Z—Back (B), Present (P), Forward (F)→(Time and Space) Past, Present, Future
3. Interval (Micro level)—numbers followed by the initial of directions on each axis
   - X—L5-1, *CL2 CL1 C CR1 CR2, R1-5→Technology Categories 5-1, *Creativity Categories, Humanity Categories
     - Unique to the X Axis, Note that interval numbers increase from the Center position. Therefore, the Left-most sub volume is indicated with 5 counting down the interval towards the Center (L5-1).
     - *Creativity Division has an extra initial (of the direction corresponding to the Left or the Right) to indicate interval away from the Center (CL & CR).
   - Y—D1-5, M1-5, U1-5→Layers 1-5, Concept element to Library Collection
   - Z—B1-5, P1-5, F1-5→Steps 1-5, Interest to Execution Three aspects for each of the three, becomes a 9 part unique location name/coordinate "code". Separated by double slashes (//)

[X Axis][Direction][Interval]//[Y Axis][Direction][Interval]//[Z Axis] [Direction] [Interval]

Population Example

Example that can be mapped to cube (the CCC): Physical therapy program for shoulders Problem looking to be solved: fixing a bad shoulder and maintaining good condition after treatment.

Background: I have had minor pain in my right shoulder, presumably because of my lack of care over the years despite my active lifestyle, dramatically got worse after an incident where I fell off a ladder landing on the same shoulder.

Current solution: After visiting my doctor, I was recommended to take the X-ray—which showed no visible damages, then was recommended a physical therapist—who diagnosed and put me on a schedule to have physical therapy sessions.

"Roadmap" for this particular experience from current solution:

Problem: bad shoulder→visit to the doctor's office→problem area narrowed: bad rotator cuff→x-ray showed no visible damage (no surgery needed)→recommendation to go see a physical therapist→physical therapy sessions scheduled→solution (physical therapy): many different types of exercises (strengthening, improving range of motion, sleep and posture, and pain management, etc.)→check in and evaluate to see if the shoulder improves or worsen Possible Improvement to Current Solution:

Each exercise with different focus (strengthening, improving range of motion, sleep and posture, and pain management, etc.) had its own sequence of steps to follow I have gotten a schedule that lists the exercises and important details, but over time, some details were forgotten and the routine had to start over in order to attempt again at tracking the progress. I had to remind the therapist about where we left off from the last session and the session was adjusted after my reminder Being able to compare myself with someone with similar conditions with visualization, not solely taking up on anecdotal evidence It's not effective for me to execute two different methods at once (spending twice the amount of time in physical therapy does not yield on double the expected results)—therefore, being able to share visualized knowledge using common denominator structured framework (CCC), when accepted and shared, can communicate information in a new way that is more useful Use Example (Populating the framework)—keeping the scenario above in mind, following is an illustration of how this same instance can be used to populate the framework. This one particular scenario is not contained in a single volume but it populates multiple volumes in the framework where it is relevant.

Location on CCC: XC//YD2//ZP5

1. Z-Axis Macro levels, Time frame
   1. Back, Past: what I tried in the past/something from the past
      1. Perhaps a different therapist/method I've considered
      2. What I knew about the condition/what I did about it
      3. What I think might have been the cause of the issue b. Present, Present Location: solutions that I am currently part of i. Current physical therapy method ii. Technology I utilize at the moment iii. Recent diagnosis iv. Tips or "life hacks" you got from someone with a similar condition c. Forward, Future: possibilities in the future 1. Expectations or imagining what the results might be
2. Other possible solutions that you might try out after
3. What you are looking to find out 2. X and Y Axis Macro levels, Divisions and Organization
   - XL//YD// ZP, Technology Memory
     - Ex. Apps/tools/sites that I currently use (gym equipment/communication platform)
   - XL//YM// ZP, Technology Consciousness/Awareness
     - Ex. Conversations about the tools I am using
   - XL//YU// ZP, Technology Imagination
     - Ex. What I expect/guess/hope to achieve from current technology I use
   - XC//YD// ZP, Creativity Memory
     - Ex. What I am trying out right now (being in a program/current physical therapy session term)
   - XC//YM// ZP, Creativity Consciousness/Awareness
     - Ex. Conversations about currently participating routines/exercises
   - XC//YU//ZP, Creativity Imagination
     - Ex. Results/expectations/guesses/hopes I'm looking forward through present methods
   - XR//YD// ZP, Humanity Memory
     - Ex. People/organizations I am in contact with (my doctor/current physical therapist/hospital I go to/gym)
   - XR//YM// ZP, Humanity Consciousness/Awareness
     - Ex. Conversations/interactions I had with people about what people are currently trying out or where they might have been
   - XR//YU// ZP, Humanity Imagination
     - Ex. Current whereabouts of different people or places you might consider/expect to meet/go try out 3. Five Different Categories (Micro level) in each of the three Divisions (Macro level) along the X Axis, total of 15 different Categories Locations where information is to be displayed: XL5-1, XCL2-XCR2, XR1-5//YD//ZP

- XL5-1 Technology
  - XL5, Search Engine
  - XL4, Exchange Platform
  - XL3, Enterprise Software
    - Ex. Medical Enterprise Software
  - XL2, Social Media
    - Ex. Social Media platform where related information is being exchanged
  - XL1, Personal Device
    - Ex. Apps on my phone, equipment needed for the program exercises, personal wearable technology
- XCL2-XCR2 Creativity
  - XCL2, Algorithm
  - XCL1, Scientific Method
    - Ex. Clinical trial data or scientific paper related to the topic
  - XC, Problem Solving
    - Ex. Current Physical Therapy program given as a solution XCR1, Heuristic Ex. Heuristic decision making in medicine XCR2, Life Hacks Ex. Holistic medicine, simple habits, "health hacks"

XR1-5 Humanity

XR1, Individual

Ex. Doctors, Physical Therapists, individual testimonials, personal testimonials XR2, Social Ex. Groups of people I turn for medical advice (family or family friends)

XR3, Organizational

Ex. Clinics or facilities

XR4, Governmental

XR5, Civilizational

4. Example of a single categorized item organized into five different Layers (Micro level) on the Y Axis Locations where information is to be displayed: XC YD1-5 ZP YD1, Concept Elements Ex. Any medical terms, concepts, or exercises that was introduced within the program that might need further clarification is defined and explained on this layer (what are deltoids?—contains a picture/illustration/video, etc.)

YD2, Lesson Competencies

Ex. Rotator Cuff and Shoulder Conditioning Program (Current Solution)

YD3, Curricula

Ex. Collective of different lessons

YD4, Catalog Content

Ex. Catalog of physical therapy containing all sorts of different physical therapy curriculums (shoulder+head+neck+back+etc. . . . )

YD5, Library Collection

Ex. Physical Therapy—most abstract, bigger collective

5. Categorized and Organized item sequenced into five Steps (Micro level) on the Z Axis Locations where information is to be displayed: XC YD2 ZP1-5

ZP1, Interest

Ex. Purpose, passion, caring, and calling—initiative step for action (shows your intention—hence "interest")

ZP2, Goals

Ex. Task/job, roles/relationships, values/philosophy, mission priorities (start lining up what needs to be done—setting "goals")

ZP3, Strategy

Ex. Problem, hope/dream/opportunity, idea/solution/vision, verification evaluation (listing different methods for solution, identifying problems, what the expected results are going to be, how are you going to measure and check progress, etc.)

ZP4, Tactic

Ex. What tools are needed, who are the team involved, what kind of proposals can be made, what projects will be started ZP5, Execution Ex. Deciding on actionable step. Also Variables from Steps 1-4 become a "checklist" or sort of evaluation measure to keep track and manage the solution.

The example being mapped can be stored & mapped to this location

Additional framework population examples: See, e.g., FIG. 8*c*. Some examples of potential opportunities for pilot projects to transform and reframe existing one dimensional and two dimensional populated framework to three dimensional visual representation displays with the architecture of The Whole System 3D conceptual framework with a pattern recognition user interface include:

Humanity Personal XR1

Joseph Kvedar, M D at Mass General Brigham Connected Health Conference. Designing for healthy habits for better outcomes with Personal Lifestyle Skills curriculum.

Humanity Social XR2

President Larry Bacow at Harvard University to provide learning on the Atkinson Artificial Mind for all students and faculty to augment human intelligence for learning and teaching.

Lorraine Powell Jobs at XQ Institute to inspire entrepreneurs to help fix America's High Schools Humanity Organizational XR3

Atul Gawande, M D at Haven Healthcare to help employees take responsibility for wellbeing to reduce the cost and improve the performance of healthcare.

Humanity Governmental XR4

Governor Charlie Baker in Commonwealth of Massachusetts to improve access to behavioral healthcare with Personal Lifestyle Skills curriculum for all citizens Malcolm E Peabody Jr at IssueOne to fix democracy by reframing the election process so that citizens provide the job description, including personality, policy, and plan that are crowdsourced for candidates to interview.

Humanity Civilizational XR5

MacArthur Foundation's 100andChange project to curate several thousand video proposals competing for a single $100 million dollar Grant to solve the world's most critical social challenges.

Technology Personal XL1

Tim Cook at Apple to provide an architecture for the iPhone to augment reality with platforms such as HealthKit.

Technology Social XL2

Mark Zuckerberg at Facebook to reframe the architecture to an augmented reality 3D user interface to unleash the potential of all users.

Technology Organization XL3

Mark Benioff at Salesforce.com to revolutionize the architecture of Success Platform to implement The Whole Connected Health System.

Jeff Bezos at Amazon to introduce revolutionary 3D architecture for visual representation display of all products and services such as online stores, kindle books, and healthcare so that users have more intuitive common sense effective and efficient access to services.

Technology Governmental XL4

US Government Healthcare exchanges to help citizens take responsibility for healthcare and get paid for performance improvement in dealing with chronic critical illness.

Technology Civilizational XL5

Sundar Pichai at Alphabet to reimagine and to transform the architecture of their operating system.

Wikipedia to reframe their knowledge repositories with visual representation of information.

Creativity Creative Process C

Schools and Colleges to reframe and integrate their libraries, catalogs, curricula, lessons, and concepts to the conceptual framework of The Whole System.

Creativity Scientific Method XCL1

FDA and pharmaceutical industry to implement a transformation of the single variable Randomized Control Trial, that is expensive and time consuming, to evaluate multifactorial interventions with crowdsourced data.

Creativity Algorithm XCL2

Tim Berners-Lee at the World Wide Web Consortium to implement Charlie's Conceptual Cube to integrate the computer with cognition.

Creativity Heuristics XCR1

Ray Dalio at Bridgewater Associates to reframe his philosophy in the book "Principles" to create a visual representation display of the processes, preferences, perspectives, practices, and performances to share with the world.

Creativity Life Hacks XCR2

General solutions/shortcuts in any situation that results in more productivity/efficiency including: "rebooting", "start over", "changes horses", "add more water", "close the doors and windows", "make a list"

Elements of FIG. 6 are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, hard disks, optical disks, Flash ROMS, nonvolatile ROM, and RAM. Augmented reality, virtual reality, mixed reality, and any now-known or future-developed 3D technologies for visualization can be used. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A method for creating and utilizing a representation of a conceptual framework for information, comprising:

placing representations of multiple separate steps in a plurality of separate volumes along an axis, wherein each step represents a temporal aspect and a spatial aspect;

for each of the separate volumes, defining a plurality of separate sub-volumes organized along or parallel to x, y, and z mutually orthogonal axes of the volume, to create a conceptual framework, wherein each volume comprises the same quantity of separate sub-volumes, and wherein the sub-volumes within each volume are organized, staged and sequenced according to a plurality of pre-defined semantically distinct conceptual categories, each conceptual category corresponding to a semantically distinct layer of the sequence;

populating the sub-volumes with data that is stored in a computer memory and is associated with the conceptual category of the respective sub-volume; and retrieving, by a processor, data from one or more sub-volumes in response to a user input identifying one or more conceptual categories.

2. The method of claim 1, wherein the temporal aspects comprise past, present, and future, and the spatial aspects comprise back, present location, and forward.

3. The method of claim 1, wherein each volume comprises five separate sub-volumes along or parallel to each of x, y, and z mutually orthogonal axes, wherein the five sub-volumes along each axis are pre-defined as a fixed, ordered, staged and sequenced conceptual categories, the ordering of which enables a cognitive training progression to be determined.

4. The method of claim 3, wherein the separate sub-volumes for each representation of the z axis comprise five aspects, namely interest, goals, strategy, tactics, and execution, the separate sub-volumes for each representation of the y axis comprise five aspects organized from concrete to abstract, and the separate sub-volumes for each representation of the x axis comprise five aspects organized from one to many.

5. The method of claim 4, wherein the five aspects for the y axis comprise concept elements, lesson competencies, curricula, catalog content, and library collection, and the five aspects for the x axis comprise individual, social, organizational, political, and civilizational.

6. A method for creating and utilizing a representation of a conceptual framework for information, comprising:

placing representations of multiple separate steps along a z axis, wherein each step represents a temporal aspect and a spatial aspect;

placing representations of multiple separate divisions along an x axis that is orthogonal to the z axis;

placing representations of multiple separate layers along a y axis that is orthogonal to the x and z axes;

creating, from the representations along the x, y, and z axes, a representation of a three-dimensional mind palace structure comprising a plurality of separate volumes, one volume at each intersection of the multiple representations along each of the three axes, and wherein each volume comprises a plurality of sub-volumes organized along or parallel to the x, y, and z axes of the volume, wherein the sub-volumes within each volume are dimensioned by pre-defined conceptual categories organized in a fixed, staged, and sequenced structure, such that each sub-volume corresponds to a semantically distinct conceptual category; and populating the sub-volumes with data that is stored in a computer-readable memory and associated with the conceptual category of the respective sub-volume, such that the three-dimensional mind palace structure supports user-driven retrieval of data based on user selection of one or more conceptual categories.

7. The method of claim 6, wherein the temporal aspects comprise past, present, and future, and the spatial aspects comprise back, present location, and forward.

8. The method of claim 7, wherein each volume comprises the same quantity of separate sub-volumes.

9. The method of claim 8, wherein each volume comprises five separate sub-volumes along or parallel to each of x, y, and z mutually orthogonal axes.

10. The method of claim 9, wherein the separate sub-volumes for each representation of the z axis comprise five aspects, the separate sub-volumes for each representation of the y axis comprise five aspects organized from concrete to abstract, and the separate sub-volumes for each representation of the x axis comprise five aspects organized from one to many.

11. The method of claim 10, wherein the five aspects for the z axis comprise interest, goals, strategy, tactics, and execution, the five aspects for the y axis comprise concept elements, lesson competencies, curricula, catalog content, and library collection, and the five aspects for the x axis comprise individual, social, organizational, political, and civilizational.

12. A computer-implemented system for organizing, retrieving, and delivering instructional data, comprising:

a computer memory storing a cube-structured knowledge repository that defines a plurality of volumes arranged along respective x, y, and z axes, each volume subdivided into a plurality of sub-volumes organized along or parallel to the x, y, and z axes of the respective volume, wherein the sub-volumes within each volume are dimensioned by pre-defined conceptual categories arranged in a fixed, staged and sequenced structure that is based on cognitive architecture principles and wherein the conceptual categories are defined independently of any data populated into the sub-volumes, such that sub-volumes are ordered along each axis;

data that is stored in the computer memory and is associated with the conceptual category of particular sub-volumes; and a processor that is configured to retrieve data from sub-volumes in response to a user input identifying one or more conceptual categories, wherein the retrieval is based on the pre-defined conceptual category corresponding to the selected sub-volume.

* * * * *